April 20, 1926.
J. E. ESHBAUGH
1,581,567
SLIDE RULE
Filed June 9, 1923
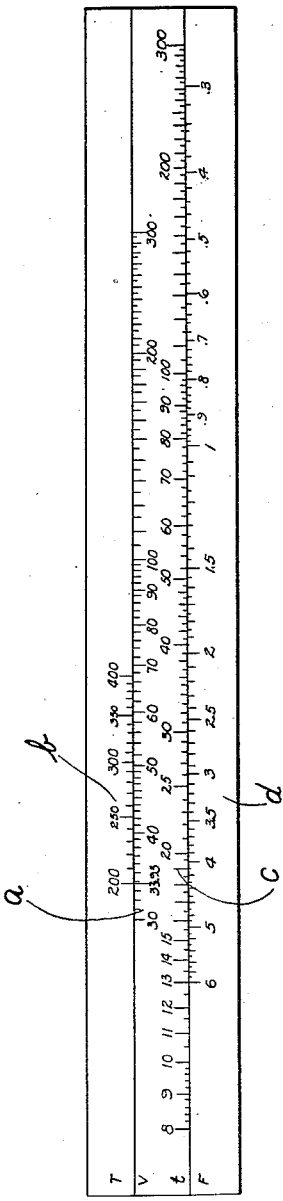
INVENTOR
JESSE E. ESHBAUGH.
BY
ATTORNEY Patented Apr. 20, 1926.

1,581,567

UNITED STATES PATENT OFFICE.

JESSE E. ESHBAUGH, OF DAYTON, OHIO.

SLIDE RULE.

Application filed June 9, 1923. Serial No. 644,475.

*To all whom it may concern:*

Be it known that I, JESSE E. ESHBAUGH, a citizen of the United States, residing at Dayton, in the county of Montgomery and State of Ohio, have invented certain new and useful Improvements in Slide Rules, of which the following is a specification.

This invention relates to slide rules of special type having logarithmic scales which represent volumes to be used in a computation. The main object of my invention is to provide a slide rule of this type in which four logarithmic scales are used and in which three of these scales read from left to right while the fourth scale reads from right to left so that a computation can be made by means of a single move of the slide.

Further objects are more fully set forth in the attached specification and claims and in the drawings, in which:

Fig. 1 is a plan view of one form of my invention, in which the scales represent volume, temperature, time and volume per unit time, and in which the temperature is given in absolute degrees.

Fig. 2 is a second form of my invention in which the temperature is given in degrees centigrade.

In testing oxygen regulators of the type used to regulate the supply of oxygen from an oxygen tank to a pilot of an airplane, the volume displacement method is used. The formula used in this method of testing the quantity of oxygen emitted by the regulator per unit of time, is expressed as follows: $F = \frac{463V}{Tt}$ in which F = liters of oxygen emitted per minute; V = total volume of the test chamber in liters; T = temperature of the regulator; t = time in seconds for the pressure in the test chamber to change 2 centimeters of mercury. The values V, T, and t are determined from which the fourth variable may be computed and this computation is quite readily made by a slide rule as set forth in either Fig. 1 or Fig. 2.

In Fig. 1, a slide rule is shown having a central slider and a main base of a conventional construction. The base is provided with a logarithmic scale "b" which is suitably marked by indices from the left to the right. This scale is used to indicate the absolute degrees temperature in the computation. A scale "a" which reads from left to right is provided on the slider adjacent to the scale "b" and indicates the volume of the test chamber. A scale "c" on the bottom of the slider reads from left to right and indicates the time for the pressure in the test chamber to change two centimeters of mercury. The fourth scale which is on the rule base reads from right to left contrary to the other three scales, and indicates the liters of oxygen emitted per minute. All four of these scales are of the same logarithmic value.

In order to determine the value of F for any computation, the value of T which was determined during the test, is located on the upper scale. The slider is then moved until the value of V which was determined during the test, is opposite to this value of T. The slider has thereby been set so that opposite the value of "t" which was determined during the test, the corresponding value of F may be read. It will be necessary to have these scales so related that the desired values of F, V, t and F come within the working portions of the scales and it is not at all necessary and it is indeed oftentimes impractical to have scales all starting from 1 or from the same number of a different value. The relative positions of the scales may be determined by making one computation or calibration and all other computations or calibrations will then be absolutely correct.

It will be obvious that such a slide rule can be applied for solving other computations having a somewhat similar formula and it is not desired to limit myself to the particular embodiment which has been shown by way of illustration.

I claim—

A slide rule having a slide and a base, bearing two sets of logarithmic scales one set of two different scales upon each side of its longitudinal center, a scale "a" of one set being on the slide, a scale "b" of the same set being upon the base, all of said scales having different origins, and scales "c" and "d" of the other set being upon the slide and base respectively, three of said scales reading in the same direction and the fourth reading oppositely; said scales being so related that $\frac{b}{a} = \frac{k}{cd}$ at any single position of the slide.

In testimony whereof I affix my signature.

JESSE E. ESHBAUGH.